United States Patent
Sherman et al.

(10) Patent No.: US 10,891,085 B2
(45) Date of Patent: Jan. 12, 2021

(54) SYSTEM, NETWORK ARCHITECTURE AND METHOD FOR ACCESSING AND CONTROLLING AN ELECTRONIC DEVICE

(71) Applicant: gabi Solutions, Inc., Fairfield, NJ (US)

(72) Inventors: Norman Sherman, Fair Lawn, NJ (US); Luis J. Diaz, Chester, NJ (US)

(73) Assignee: gabi Solutions, Inc., Fairfield, NJ (US)

( * ) Notice: Subject to any disclaimer, the term of this patent is extended or adjusted under 35 U.S.C. 154(b) by 0 days.

(21) Appl. No.: 16/587,599

(22) Filed: Sep. 30, 2019

(65) Prior Publication Data

US 2020/0097223 A1  Mar. 26, 2020

Related U.S. Application Data

(63) Continuation of application No. 15/997,236, filed on Jun. 4, 2018, now Pat. No. 10,430,125.

(51) Int. Cl.
*G06F 3/12* (2006.01)
*G06F 21/40* (2013.01)
*G06F 9/54* (2006.01)

(52) U.S. Cl.
CPC ............ *G06F 3/1204* (2013.01); *G06F 3/123* (2013.01); *G06F 21/40* (2013.01); *G06F 3/1288* (2013.01); *G06F 9/54* (2013.01)

(58) Field of Classification Search
None
See application file for complete search history.

(56) References Cited

U.S. PATENT DOCUMENTS

| | | |
|---|---|---|
| 6,088,717 A | 7/2000 | Reed et al. |
| 6,526,381 B1 | 2/2003 | Wilson |
| 7,416,116 B2 | 8/2008 | Sardano |
| 7,996,269 B2 | 8/2011 | Inouye |
| 8,711,404 B1 | 4/2014 | Clark et al. |
| 9,224,394 B2 | 12/2015 | Schalk et al. |
| 9,477,737 B1 | 10/2016 | Charyk et al. |
| 9,619,655 B2 | 4/2017 | Bach et al. |
| 2003/0123887 A1 | 7/2003 | Imes et al. |
| 2004/0122625 A1 | 6/2004 | Nasser et al. |
| 2004/0215533 A1 | 10/2004 | Doeberl et al. |
| 2005/0038724 A1 | 2/2005 | Roever et al. |
| 2005/0071348 A1 | 3/2005 | Laicher et al. |
| 2006/0171377 A1 | 8/2006 | Gusmano et al. |
| 2006/0178917 A1 | 8/2006 | Merriam et al. |
| 2006/0227946 A1 | 10/2006 | Henderson |
| 2007/0299733 A1 | 12/2007 | Derby et al. |
| 2009/0023395 A1 | 1/2009 | Chang et al. |

(Continued)

OTHER PUBLICATIONS

The U.S. office actions, dated Nov. 1, 2018 and May 20, 2019, in the related U.S. Appl. No. 15/997,236.

(Continued)

*Primary Examiner* — Thomas D Lee

(57) ABSTRACT

A system, network architecture and method for accessing and controlling an electronic device enable a user to change the function and functionality of an electronic device located either proximate to or remote from the user. With a user device such as a smartphone, a user can port functionality to an electronic device that enables the electronic device to function in a way dictated by the user. In particular, the electronic device can be made to function in a way that the device is capable of functioning, but for which the device is currently not programmed to function.

20 Claims, 15 Drawing Sheets

(56) References Cited

U.S. PATENT DOCUMENTS

| | | |
|---|---|---|
| 2009/0030681 A1 | 1/2009 | Sureka et al. |
| 2012/0060142 A1 | 3/2012 | Fliess et al. |
| 2012/0262749 A1 | 10/2012 | Yamamoto |
| 2013/0162411 A1 | 6/2013 | Moses et al. |
| 2013/0342866 A1 | 12/2013 | Hansen et al. |
| 2016/0139646 A1 | 5/2016 | Shiga |
| 2016/0277439 A1 | 9/2016 | Rotter et al. |
| 2017/0012961 A1 | 1/2017 | White et al. |
| 2017/0046698 A1 | 2/2017 | Haldenby et al. |
| 2017/0280003 A1 | 9/2017 | Haba et al. |
| 2019/0272541 A1 | 9/2019 | Koeppel et al. |

OTHER PUBLICATIONS

The U.S. office action, dated Mar. 9, 2020, in the related U.S. Appl. No. 16/029,191.
The U.S. office actions, dated Jun. 27, 2019 and Mar. 5, 2020, in the related U.S. Appl. No. 16/135,202.
The U.S. office actions, dated Oct. 4, 2019 and Mar. 5, 2020, in the related U.S. Appl. No. 16/222,448.
The International Search Report and Written Opinion, dated Feb. 14, 2019, in the related PCT Appl. No. PCT/US2018/035863.
The International Search Report and Written Opinion, dated Jan. 24, 2019, in the related PCT Appl. No. PCT/US18/51648.
The International Search Report and Written Opinion, dated Apr. 23, 2019, in the related PCT Appl. No. PCT/US18/66000.

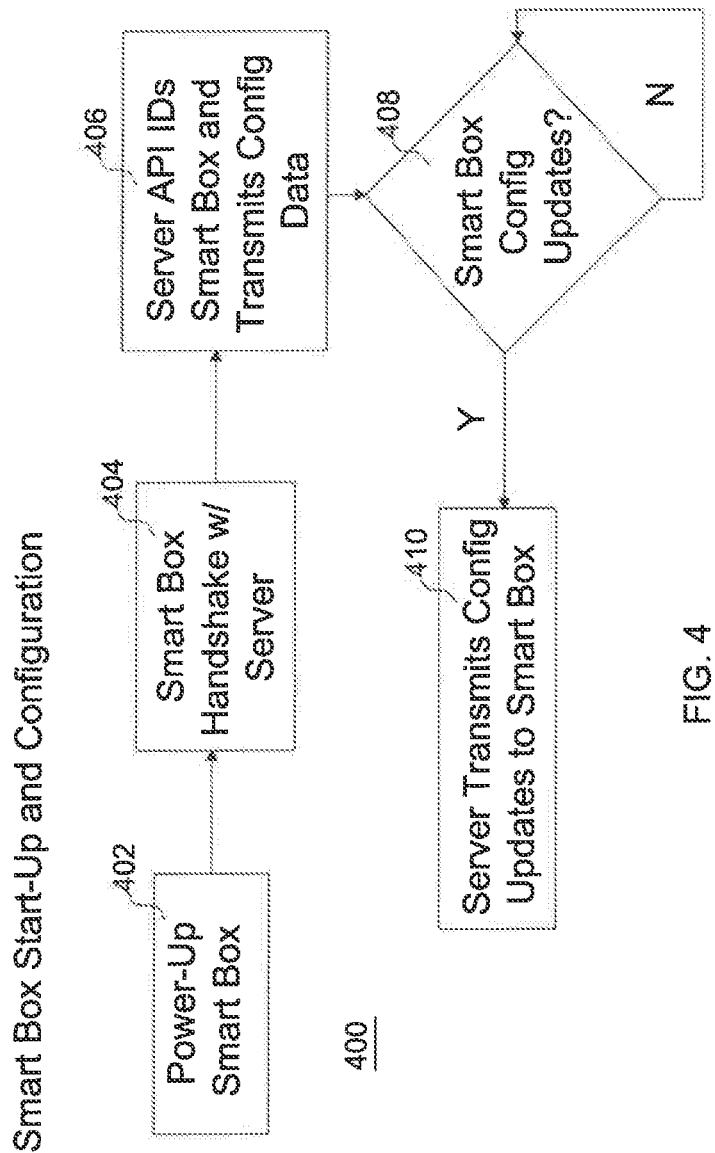

SYSTEM, NETWORK ARCHITECTURE AND METHOD FOR ACCESSING AND CONTROLLING AN ELECTRONIC DEVICE

CROSS-REFERENCE TO RELATED APPLICATIONS

This application is a continuation of U.S. patent application Ser. No. 15/997,236, entitled, "System, Network Architecture And Method For Accessing And Controlling An Electronic Device," filed on Jun. 4, 2018, now issued as U.S. Pat. 10,430,125 on Oct. 1, 2019, which is assigned to the same Assignee and is hereby incorporated by reference herein in its entirety.

FIELD OF THE INVENTION

The present invention is direction to a system, network architecture and method for accessing and controlling an electronic device.

BACKGROUND OF THE INVENTION

Electronic devices are continually getting "smarter" as greater processing power becomes available in smaller and smaller packages. With many types of electronic devices now ubiquitously part of personal and professional life, they occupy a unique position in our lives. They provide an easy-to-use, powerful tool that can be used to improve, and even to introduce paradigm shifts to how certain things are done. Listening to music on a smartphone is one simple example. This presents endless opportunity for applications on a smartphone or other user electronic devices.

It seems, however, that most of the productivity improvements introduced through devices like personal devices like the smartphone are personal, rather than professional. It's easier to find things like restaurants, stores, etc. using navigation features of a smartphone. It's easier to keep in touch through phone calls, text messaging, social network accounts like Twitter and Facebook, and email. It's easier to take and share pictures. And myriad other applications that attempt to improve personal life. Professional life has not been overlooked, but it seems that the improvements here are more limited in type, scope and impact. For example, it's also easier to keep in touch professionally through phone calls, text messaging and email. It's easier to maintain professional contacts and to gain access to those contacts anytime, anywhere. It seems, however, the the professional improvements brought about through the portability and availability of computer processing power have not presented a significant shift in how business is done. Professional improvements seem to fall into the category of improved efficiency, but certainly nothing considered a paradigm shift. There remain many opportunities for such improvements to professional life that are possible with more intelligent personal electronic devices like the smartphone.

Electronic devices tend to be designed and configured for a particular purpose or function. While electronic devices may be multi-function devices, e.g., a multi-function printer, or a smart phone that can make phone calls, takes pictures and play music, the function(s) are typically pre-programmed, and a user of the device is limited to these preprogrammed functions. However, because an electronic device is preprogrammed for a particular function or functions does not mean those are the only functions the device is capable of performing. To the contrary, many electronic devices are capable of performing functions for which they are not programmed. Unfortunately, a user is limited to the preprogrammed and available functions of an electronic device unless the user pays to upgrade the device to enhance and/or expand its functionality. It has not currently been possible for a user, in real-time, to use a personal electronic device like a smartphone to access and control a target electronic device in a way that changes the function or functionality of the target device.

Consider a multi-function printer ("MFP"), as one example. Although this device is configured to perform certain functions, e.g., print, scan, copy, email, it is also able to perform functions beyond these. For example, a typical MFP is capable of scanning a document and sending it via email by accessing an address book stored in the MFP, provided that the user is in front of the MFP and directly controlling it. The MFP cannot send an email in response to an instruction from a user device, and to an email address provided by that user device, i.e., to an address that is not part of the MFP address book. The MFP also cannot email a document that is not scanned at the MFP. Thus it is possible for an MFP to email documents, but only using its own address book and only using document it scans. Thus, these functions of the MFP, as examples, are available but limited by the preprogrammed configuration of the MFP.

In addition, an MFP has on-board intelligence beyond what is necessary to control the core functions of the printer. MFPs have networking functionality, enabling direct or wireless connection to a network, and authorization functionality to prevent unauthorized use of or access to the MFP, as two examples. MFPs are also able to collect and log usage data, including various metrics such as per-user usage, paper tray utilization, toner status, etc. Currently, access to and use of this data is not generally available to a user of the MFP.

In addition to the above-noted shortcomings of the prior art, it is also currently not possible to access significant types and amounts of data captured by an MFP, and use that data to intelligently manage the use and operation of the MFP. It is also currently not possible to create automatic service events for an MFP based upon usage data and most anticipated or most common service requirements. It is also currently not possible to remotely construct and control custom operations for an MFP such as, by way of non-limiting example, a custom print job that involves a sequence of discrete steps carried out by the MFP with or without user interaction.

What is lacking in the prior art is a system, network architecture, or method that addresses and/or overcomes the above-described shortcomings of the prior art. More specifically, a system, network architecture or method is lacking that enables a user to access and control an electronic device in a way that adds to or changes the function or functionality of the electronic device. What is further lacking in the prior art is a such a system, network architecture, or method that is user-centric—empowering the user to access, control, and to change the function of an electronic device.

SUMMARY OF THE INVENTION

The present invention is directed to solving the technical problem of user-centric access to and control of electronic devices. As used herein, the phrase "electronic device" is used to describe any of a singular electronic device, or one or more electronic devices connected or connectable via any means to communicate with each other. This phrase is further used in an expansive way, and intended to encompass any type of known or hereafter developed electronic device usable in connection with, or suitable for carrying out all or part of, the present invention. Currently, user control of certain types of electronic devices is limited to controlling predefined or preconfigured function(s) of the devices. In other words, the user is limited to the function(s) the device was designed and configured to perform. A user typically cannot change the function, or add functionality to certain types of electronic devices. The inventors of the preset invention have invented a novel and non-obvious solution to this technical problem.

In accordance with embodiments of the present invention, a system for accessing and controlling a target electronic device comprises a general purpose processing device or computer ("smart box") connectable to a network, a user device control installable on a user electronic device, and a server. The user device control, smart box and server enable a user of the user electronic device to cause the target electronic device to perform a function selectable by the user, but that may not be a function native to the target electronic device. Specifically, the present invention uses a server, a smart box, and a user electronic device to enable a user to add functionality to, or change the functionality of, a target electronic device by means of functionality made available by and via the other devices. Embodiments of the present invention thus place this added functional capability in the user's hands—via the user electronic device—and at a network edge.

In further accordance with embodiments of the present invention, a network architecture for accessing and controlling a target electronic device comprises a smart box connectable to the network, a controller located at an edge of the network and a server connectable to the network. The inventive configuration of the server, smart box, and controller create a unique and unconventional network architecture that enables a user of a user electronic device to cause the target electronic device to perform a function selectable by the user, but that may not be a function native to the target electronic device. Thus, the present invention locates the ability to access and control the function and functionality of electronic devices with a user at a network edge. The inventive and unique network architecture of embodiments of the present invention thus places an intelligence aspect of electronic devices in the hands of users of the electronic devices at a network edge. As used herein, the phrase intelligence aspect refers to the ability to control the function or functionality of an electronic device, in the prior art, such control is limited in reach and scope. Typically, users are not able to change the function or functionality of an electronic device. Embodiments of the present invention enable users to do just that by creating a novel and non-obvious network architecture that is tied to a specific structure, connection and arrangement of components, purposefully structured, connected and arranged to achieve the inventive technological solution of the present invention. Thus, the inventive concept of the present invention is found not only in the unconventional use of the conventional, user electronic device, smart box, and server, but also in the unconventional structure, connection and arrangement of known, conventional components creating a unique network architecture.

The present invention introduces a paradigm shift in the way electronic devices are accessed and controlled by creating a user-centric environment that transfers control over the function and functionality of a target electronic device from the device itself (i.e., a device-centric environment) to a user electronic device (i.e., a user-centric environment). While the prior art teaches rudimentary access to and control of an electronic device from a user electronic device (e.g., controlling your thermostat from your mobile phone), embodiments of the present invention enable a user to not only control the electronic device, but to add functionality, change functionality, or otherwise modify the operation of the electronic device. Such an innovative and unconventional technological solution to the technological problem of controlling electronic devices and systems is not found in the prior art. Advantageously, the user-centricity created by the present invention places, in each unique user's hands, the ability to effect such control over a target electronic device in accordance with that unique user's needs or desires. And because of the ubiquity of personal user electronic devices, the present invention eliminates user learning curves for new devices, integration issues associated with adding/replacing devices, and restrictions on available functionality from pre-configured devices.

Not only does the present invention use a conventional device in an unconventional way, embodiments of the present invention are tied to a specific structure, connection and arrangement of components, purposefully structured, connected and arranged to achieve an inventive technological solution to a technological problem specific to electronic devices and systems—the inability of a user to control the function and functionality of such devices and systems. Whereas the prior art, representing a device-centric environment, restricts control of electronic devices and systems to either authorized entities (e.g., manufacturers, service personnel, etc.), users in proximity, or users with only access and control limited to the pre-configuration of the device, the present invention creates a user-centric environment that enables users to each independently and separately control not only the function but also the functionality of electronic devices and systems. Thus, an intelligence aspect of electronic devices and systems is relocated from the device itself to an edge of a network within which the devices and systems operate—one such edge being defined from the perspective of each unique user's electronic device looking inward into the network—thus creating a user-centric network architecture and environment. That intelligence aspect is control over the function and functionality of the devices and systems which, in accordance with embodiments of the present invention, is now in the hands of each user.

In accordance with embodiments of the present invention, a number of advantages are now realized. By recognizing that personal electronic devices are ubiquitous, and by further recognizing that for each such device, the user interface and use of the device can be considered universal, i.e., it is the same for each device within a category of devices, the present invention provides universality in its solution to the problems with the prior art discussed above. More specifically, the present invention advantageously recognizes that a user of a smartphone, for example, does not encounter a learning curve when additional features are added to the smartphone, or when the smartphone is used in a new way, as with the present invention. Rather, the introduction of new features and functionality to the user via the user's smartphone is relatively seamless. Thus, the present invention enables a user to change the function and/or functionality of a target electronic device without having to learn how to use that device to perform the new/changed function.

The present invention also advantageously provides universality across controllable electronic devices. Regardless of the type of device, or of the manufacturer of a device type (e.g., HP, Dell, Canon, etc. for MFPs) to be accessed and controlled, the present invention enables a user electronic device to access and control an electronic device by separating the user interface from the target electronic device and placing it with the user on a platform with which the user is familiar. The present invention thus makes its technology frictionless, as the user need not care or know about the type of electronic device being accessed or controlled to realize the advantages of the present invention.

The present invention also advantageously extends a periphery about an electronic device from in-fact proximity to the device, to a smart box connectable to the electronic device over a network, and to a user electronic device. In so doing, the present invention not only places access to and control over electronic devices to which the user desires to connect or interact in the user's hand, the present invention further makes such access and control user-centric. Thus the present invention introduces a paradigm shift from a device-centric world to a user-centric world with respect to accessing and controlling electronic devices in a way that enables the user to change the function or functionality of the device. Prior to the present invention, a user could access and control an electronic device, but the control was limited to the functions and functionality preprogrammed into the electronic device. In accordance with embodiments of the present invention, under the new user-centric paradigm, a user can change and/or add functionality to a target electronic device. What an electronic device is able to do is no longer limited to how it was programmed. Rather, the present invention places control of the functionality of an electronic device in the hands of a user, creating a user-centric, edge-based intelligence in a network.

In accordance with embodiments of the present invention, voice recognition technology may be used to cause a target electronic device to respond to voice commands when the target device is not configured for voice activation. In further accordance with embodiments of the present invention, a target electronic device can utilize 2-factor authentication such as, by way of illustration and not limitation, biometric authentication, by utilizing functionality native to a user electronic device and causing, by virtue of the present invention, the target electronic device to employ 2-factor authentication. Thus the present invention leverages the nativity of a function (e.g., 2-factor biometric authentication) on the user electronic device to enable the MFP (i.e., the target electronic device) to respond as if the function is native to the MFP. In still further accordance with embodiments of the present invention, intelligent usage and management of a target electronic device is possible through access to, and collection and analysis of usage data already collected by the target device. Prior to the present invention, such data was not readily available, certainly not to users of the target electronic device(s), and certainly not by these users to intelligently use and manage the target device.

BRIEF DESCRIPTION OF THE DRAWINGS

Embodiments of the present invention will now be described with reference to the following figures, wherein:

FIG. 4 is a flow diagram of a smart box start-up and configuration process in accordance with embodiments of the present invention;

DETAILED DESCRIPTION

The following describes exemplary embodiments of the present invention. It should be apparent to those skilled in the art from the disclosure provided herein that the described embodiments of the present invention are illustrative and not limiting, having been presented by way of example only. All features disclosed in this description may be replaced by alternative features serving the same or similar purpose, unless expressly stated otherwise. Therefore, numerous and various other embodiments are contemplated as falling within the scope and spirit of the present invention.

As used herein, the phrase personal electronic device or user electronic device means, by way of illustration and not limitation, smartphones, tablets, mobile computers, desk-top computers, mobile Internet devices, laptops, wearable computers, calculator watches, smartwatches, head-mounted displays, personal digital assistants, enterprise digital assistants, handheld game consoles, portable media players, calculators, digital still cameras, digital video cameras, personal navigation devices, and smart cards, or any other known or hereafter developed personal electronic device.

Figure 1:
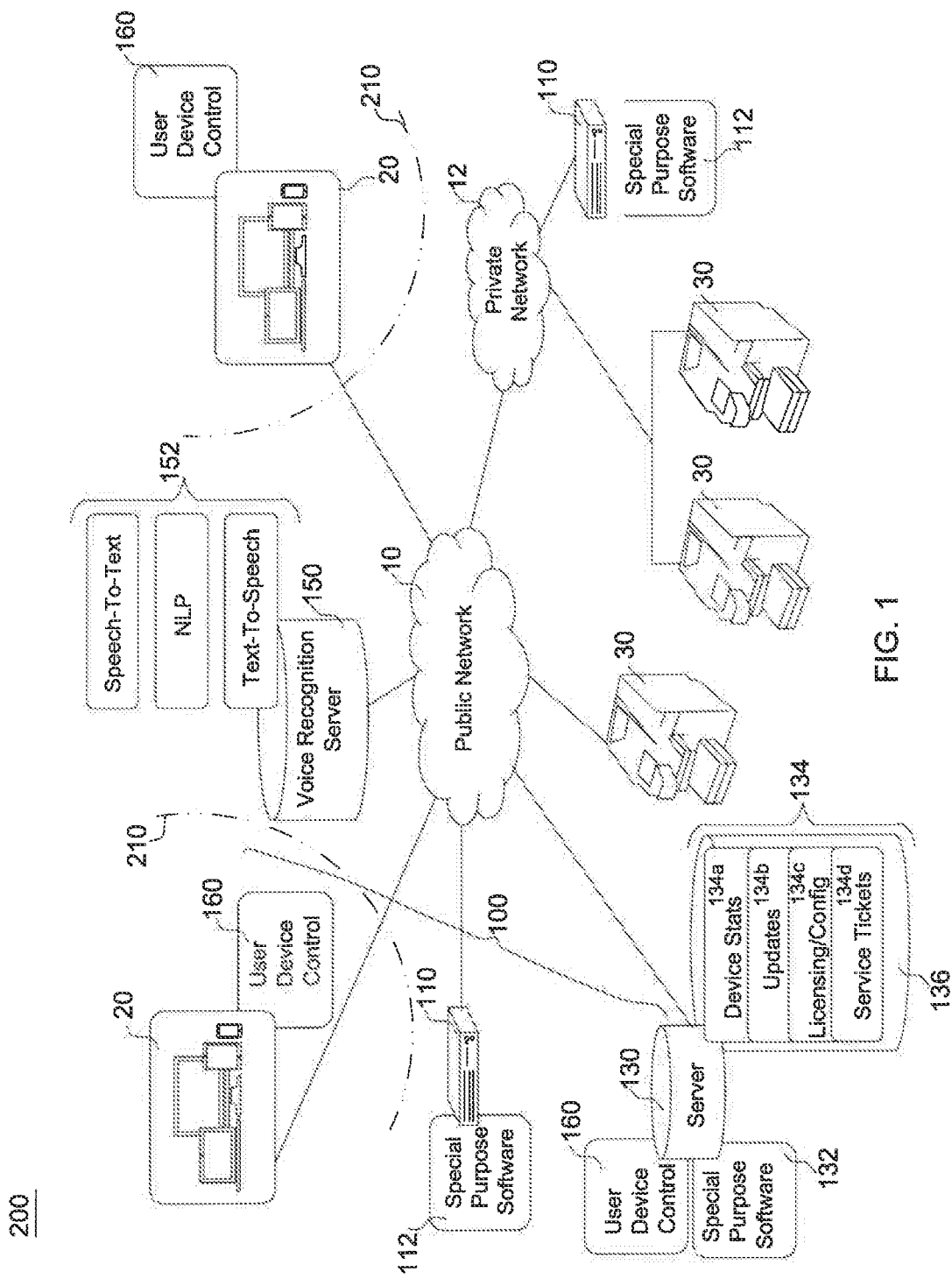
FIG. 1 is a schematic diagram of a system and network architecture in accordance with embodiments of the present invention.
Figure 2:
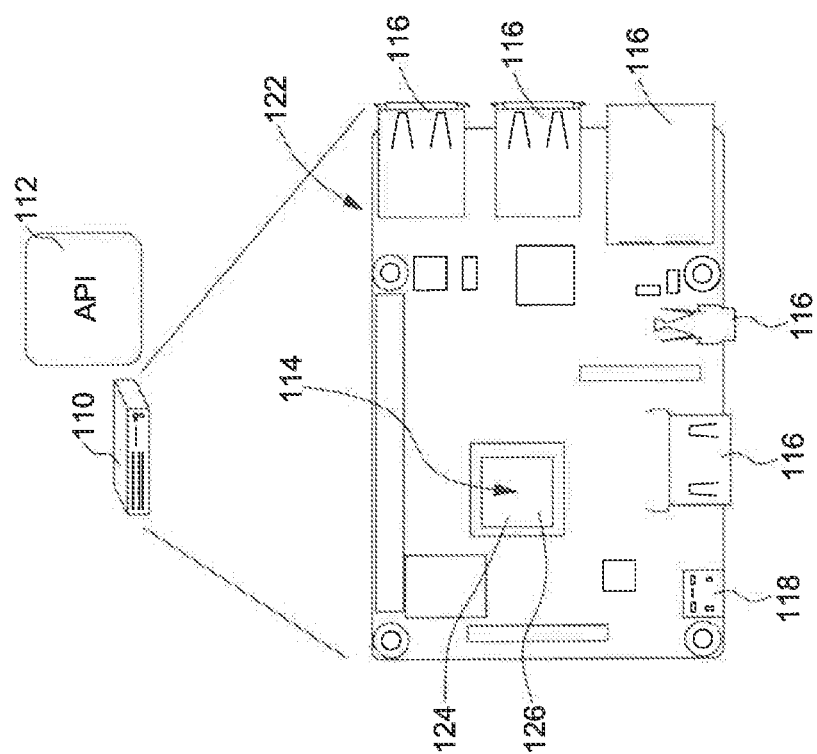
FIG. 2 depicts a single board computer of a smart box in accordance with embodiments of the present invention.
Figure 3:
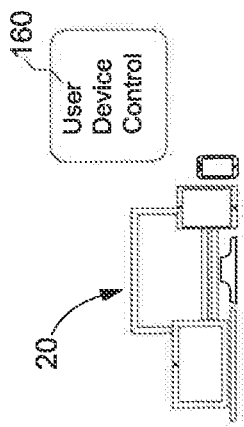
FIG. 3 depicts the structure and function of a user device control in accordance with embodiments of the present invention.

Referring next to the drawings in detail, FIGS. 1 and 2 respectively depict a schematic diagram of a system 100 and network architecture 200, and a single board computer 122 of a smart box 110 in accordance with embodiments of the present invention. The system 100 comprises a smart box 110, a user device control 160 installable on a user electronic device 20, and a server 130 that are connected or connectable to a private network 12 or a public network 10 and are in communication with each other and with target electronic devices 30. Preferably, the smart box 110 and target electronic devices 30 are part of a private network 12, while the server 130 and user electronic devices 20 are part of a public network 10. Alternatively, the smart box 110 may be part of the public network 10, yet be connectable to another smart box 110 or target electronic device 30 that are both part of a private network 12. Embodiments of the present invention provide the user device control 160 at an edge 210 of the network, thus placing the ability to control the function or functionality of an electronic device in the hands of users at the network edge 210.

The server 130 may be implemented, by way of non-limiting example, at least in part based on the machine learning platform provided by Amazon Web Services (AWS) cloud computing and storage services. The server 130 carries out certain administrative functions of the present invention. For example, the server 130 may communicate initially with a smart box 110 when the smart box 110 first connects to the network and comes on line. In this capacity, licensing and configuration data 134c previously saved as a data file 134 in server data storage 136 is communicated to the smart box 110 and usable by the smart box 110 for its initial configuration. Further configuration of the smart box 110 may be required and performed by an administrator, as described in more detail herein. The server 130 may also communicate software updates to a smart box 110 as necessary, which are stored as an update data file 134b. This communication may occur automatically and be managed by a scheduler on one or both of the server 130 and smart box 110. The server 130 may also be a repository for usage data and statistics for the electronic devices in the network 10, 12. The data and statistics may be acquired from each target electronic device 30 by the smart box 110, and communicated thereby to the server 130, where the data and statistics are stored as device stats 134a in a data file 134. A separate device statistics ("stats") file data file 134 may be created for each target electronic device 30, and that file can be used to intelligently use and manage the target electronic device 30. The server 130 may also communicate initially with a user electronic device 20 through the user device control 160 to create an account for and authenticate the user, and to bring the user electronic device 20 online.

Figure 6:
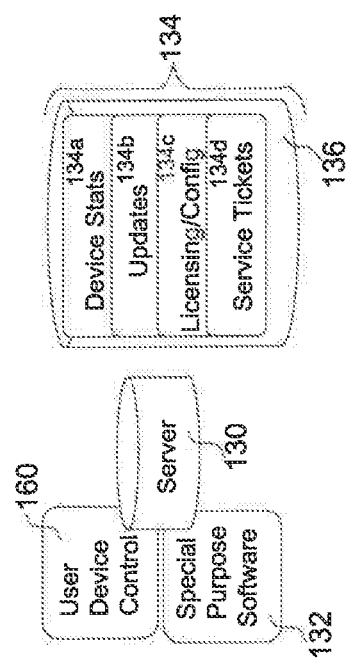
FIG. 6 depicts the structure and function of special purpose software of a server in accordance with embodiments of the present invention.

The server 130 has a processor and memory having stored therein general purpose software comprising commands or instructions executable by the processor for carrying out basic functions of the server 130, and special purpose software 132 comprising commands or instructions executable by the processor for carrying out aspects of the present invention. See also FIG. 6. The server 130 has data storage 136 that may be part of or separate from the server 130. One or more data files 134 created by use of the present invention are stored in the data storage 136 as one or more flies or databases. Exemplary types or categories of files or databases are depicted in FIGS. 1 and 6 and comprise data relating to target electronic devices 30 such as device statistics, updates and service tickets, and data relating to a user and the smart box 110 and user device control 160 such as licensing and configuration. For example, device stats 134a created by a target electronic device 30 may be captured by an associated smart box 110, and may be transmitted thereby to the server 130 at predetermined times. Such device stats 134a are currently created by an MFP, for example, but are not currently capturable nor captured by any device other than the MFP. Embodiments of the present invention capture that data and transmit it to the server 130 for storage and later use. Data files 134 may also comprise update data 134b for updates for one or more target electronic devices 30 that are transmittable, downloadable, etc. from the server 130 to the target electronic device 30. Updates may include, by way of non-limiting example, updates for general operation and function of the smart box 110, and updates for operation and function of inventive aspects of the smart box 110. Data files 134 may further comprise licensing and configuration data 134c that is unique for, and specific to a particular smart box 110. Licensing and configuration data 134c may generally comprise information provided by an administrator of a smart box 110, for example, that is used to define certain operational parameters for the smart box 110, as well as data provided by the server 130. For example, licensing and configuration data 134c for a company may include the format of a user's email, the number of users, the number of target electronic devices 30, identifiers for each target electronic device 30 (e.g., IP address), codes specific to the company and/or a group or department within the company, an API key unique to each smart box 110 that comprises a license ID and machine key, essentially a user name and password for the smart box 110, and other data and information that serve to define connection and communication rules between a smart box 110, the server 130, a user electronic device 20, and one or more target electronic devices 30.

Data files 134 may also comprise service ticket data 134d collected by the smart box 110 from the target electronic devices 30 with which it communicates. Service ticket data 134d may be generated by a user or by a target electronic device 30, indicative of a state of the target electronic device 30 that may require intervention, e.g., paper jam, toner cartridge replacement, etc.

In a preferred embodiment of the present invention, the server special purpose software 132 may comprise an application programming interface, or API, that functions as a REST-based API endpoint for communication with the smart box 110 and/or user electronic device 20. Communication between and among the various electronic devices may use Java script object notation. The API special purpose software 132 may be structured based upon sub-components that provide microservices within the API that may include, by way of non-limiting example, storing data received from a smart box 110 about one or more target electronic devices 30, providing updates to a smart box 110, routing service ticket requests, and other selectively programmable microservices that may facilitate communication between and among smart boxes 110, user electronic devices 20, target electronic devices 30, and other devices and systems, either in the private network 12, the public network 10, or a combination of both. The special purpose software 132 may additionally comprise a user device control 160 uploadable to a user device 20 that provides a user interface 700 (see, e.g., FIG. 7A). While in a preferred embodiment the user device control 160 is an application downloadable by/to a user electronic device from an app store, an alternative embodiment provides the user device control 160 on the server 130.

The smart box 110 generally functions as a universal controller that manages and controls communication by, between and among the various electronic devices that comprise the present invention, as well with as the various electronic devices which the present invention accesses and controls. The majority of communication by the user device 20 via the user device control 160 is received by or at least passes through the smart box 110. The smart box 110 is thus able to, and does in fact, capture much of the data and information created by use of the present invention, including data created by target electronic devices 30. The special purpose software 112 of the smart box 110 functions as an API endpoint for the user device control 160. The smart box 110 also controls all user access to and control of target electronic devices 30 from a plurality of user device controls 160.

The smart box 110 may comprise a single board computer 122 having a central processing unit 114 including a processor 124 and memory 126 having stored therein general purpose software comprising commands or instructions executable by the processor to carry out basic functions of the smart box 110. For example, basic functions of the smart box 110 enable the smart box 110 to power up and communicate and control communication over a variety of interfaces 116, such as USB, Ethernet, video, audio, and HDMI. Each smart box 110 may preferably be configured with dual Ethernet ports in order to communicate with each of an Ethernet-based private local area network 12 and a target electronic device 30. Each smart box 110 serves as an intermediary that employs its Ethernet interface to monitor communications of its associated target electronic devices 30 via the private network 12, provide instructions to be executed by the target electronic device 30, and retrieve data from the target electronic device 30.

An exemplary single board computer 122 is available from the Raspberry Pi Foundation, model number Raspberry Pi 3 Model B+. This model is a credit card-sized computer powered by a Broadcom BCM2835 central processing unit (system-on-a-chip) 114 that includes a 32-bit ARM1176JZFS processor 124, clocked at 700 MHz, a Videocore IV Graphics Processing Unit, and 256 MB of random access memory 126. The single board computer 122 is powered by a 5V AC charger connectable to a micro USB port 118. It will be obvious to persons skilled in the art and from the disclosure provided herein, for example, that other single board computers may alternatively be used in connection with the present invention.

The smart box 110 further comprises special purpose software 112 storable in memory 126 comprising commands or instructions executable by the processor that enables the smart box 110 to carry out certain inventive aspects of the present invention. In a preferred embodiment, the special purpose software 112 may be an API with programmable functionality. The API special purpose software 112 may be structured based upon sub-components that provide microservices within the API that may include, by way of non-limiting example, copy, email, collect, and service, as well as other selectively programmable functionality. Any of the foregoing may be enhanced, for example, by voice-enabled or two-factor biometric authentication aspects of embodiments of the present invention. Each microservice calls a unique API path for the desired functionality—the path being to at least one of the smart box 110 and server 130. The special purpose software 112 is selectively programmable and adaptable to change/add/delete one or more functions that it provides.

A process 400 for initial configuration of the smart box 110 is depicted in FIG. 4. As an initial step, the smart box 110 is pre-programmed with an API key comprised of a license ID and machine key, each unique to the smart box 110 and that together function as a user name (license ID) and password (machine key). Prior to a smart box 110 first use, it is programmed with certain data and information to enable it to connect to a server 130 upon power-up and to effect a handshake between the server 130 and smart box 110. The smart box 110 initially cycles through a start-up sequence or process when power is first applied at step 402. The general purpose software of the smart box 110 establishes a connection over the network 10 or private network 12 to the server 130 at step 404 and transmits the API key to the server 130—communicating with the server API 132. The server API 132 is configured to detect and identify the smart box 110, and to transmit configuration data to the smart box 110, at step 406. This configuration data may have been previously constructed as licensing and configuration data 134c stored in data storage 134 of the server 130 based upon information provided by a systems administrator, for example. Configuration of the smart box 110 is controlled by the API special purpose software 112, and is set by the licensing and configuration data file 134c. Once the licensing and data configuration file 134c is installed on the smart box 110, the smart box 110 is operational and ready to connect with user electronic devices 20 and carry out aspects of the present invention.

Configuration updates for the smart box 110 are transmitted by the server 130 at step 410 as update data 134b if updates are available, as determined by the server 130 at step 408. The server 130 and/or smart box 110 may be configured to transmit/receive regular software updates. At least one of the server API 132 and smart box API 112 ensures that the updates are intelligently communicated, ensuring that updates to the smart box 110 do not bypass sequential updates, i.e., preventing an update from version 1.1 to version 1.9, where intermediate versions contain important updates that may or may not be included in the most recent update.

Figure 5:
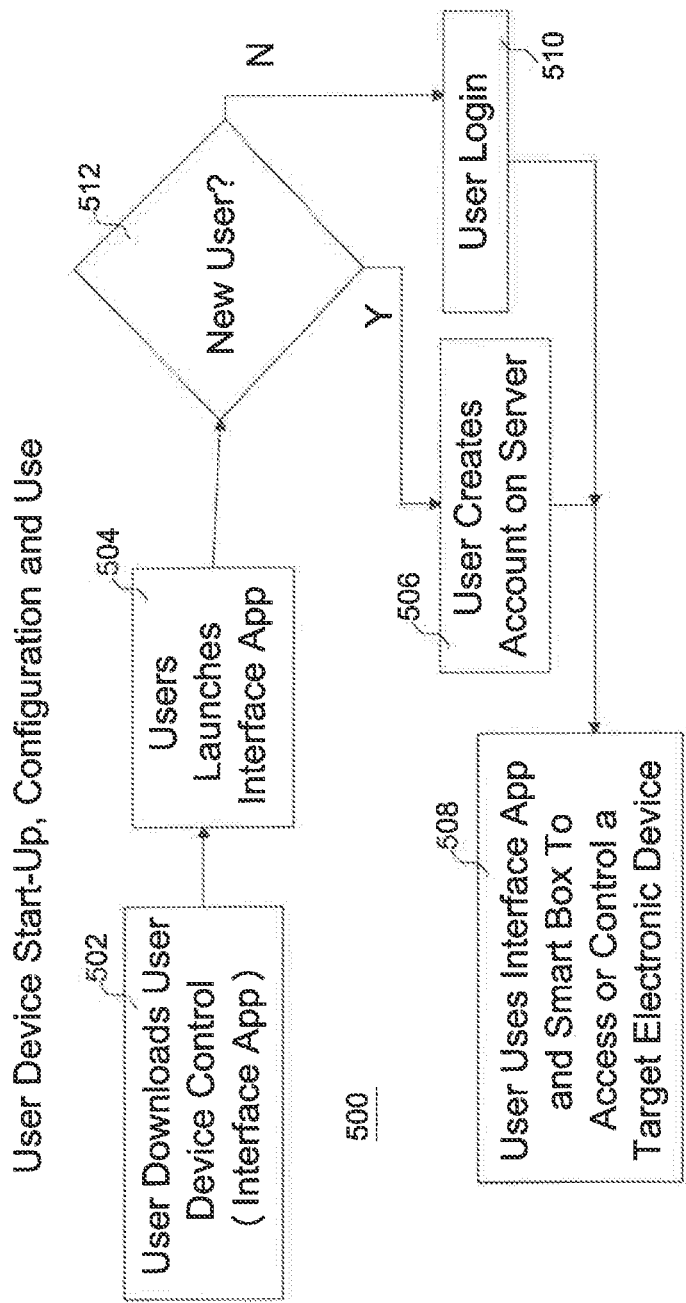
FIG. 5 is a flow diagram of a user electronic device start-up, configuration and use process in accordance with embodiments of the present invention.

The user electronic device 20 may be any electronic device capable of carrying out aspects of the present invention as disclosed herein. Preferred embodiments include, by way of non-limiting example, a smartphone or tablet. Other suitable user electronic devices 20 are also disclosed herein, and are thus contemplated by, and within the scope and spirit of the present invention, as are any hereafter developed electronic devices capable of carrying out aspects of the present invention as disclosed herein. A user desiring to utilize the present invention installs the user device control 160 on a user electronic device 20. The user device control 160 is preferably an app downloadable to the user electronic device 20 from an app store or from the server 130. Once the app is installed the user can launch the user device control 160 to utilize aspects of the present invention. Initially, a user must configure his/her user electronic device 20 to carry out aspects of the present invention. With reference to FIG. 5, a startup and configuration process 500 for a user electronic device 20 is depicted. The user first downloads the user device control 160 from an app store or from the server 130 to the user device 20, at step 502, and launches the user device control 160 at step 504. When run, the user device control 160 provides a plurality of user interfaces that enable the user to utilize aspects of the present invention. The user device control 160 determines if the user is a new user at step 512, in which case the user can create an account on the server 130, step 506, and thereafter use the user device control 160, smart box 110 and server 130 to access and control a target electronic device 30 in accordance with embodiments of the present invention. Returning users, as detected at step 512, can login at step 510 and thereafter use the user device control 160, smart box 110 and server 130 to access and control a target electronic device 30 in accordance with embodiments of the present invention. As depicted in FIGS. 7A-7J, the user device control 160 provides interfaces and carries out certain inventive aspects of the present invention.

When launched, the user device control 160 provides a user interface 700 on a display of the user electronic device via which the user can utilize aspects of the present invention. The user interface 700 comprises a plurality of screens, as depicted in FIGS. 7A-7J, each of which provide a user with access to aspects of the present invention. When launched, the user device control 160 provides the user interface 700A depicted in FIG. 7A as a home screen via which a user can either select login (returning user) 702 or register (first-time user) 704. A first-time user must select register 704, and will then be prompted to enter a unique Company Code 706 via the user interface 700B depicted in FIG. 7B. That information is transmitted to the server 130, which creates an account for the user if the information entered by the user matches information in the licensing and configuration data 134c. To validate the new user, for example, the server 130 transmits an email with a temporary PIN to the user email address, which queries the user to verify the mail by return response that includes the temporary PIN and the permanent PIN. If the email address, temporary PIN and permanent PIN match data on the serve 130, the new user account is validated. Alternatively, a company may permit self-validation by empowering the administrator to indicate which of the users attempting to register are authorized users. If this is enabled, an administrator will have access to a list of users attempting to register, and can indicate (by check-box, for example) which users are authorized—this exchange occurring between the server 130 and administrator, with the information regarding validated users being captured and stored by the server 130.

Figure 7A:
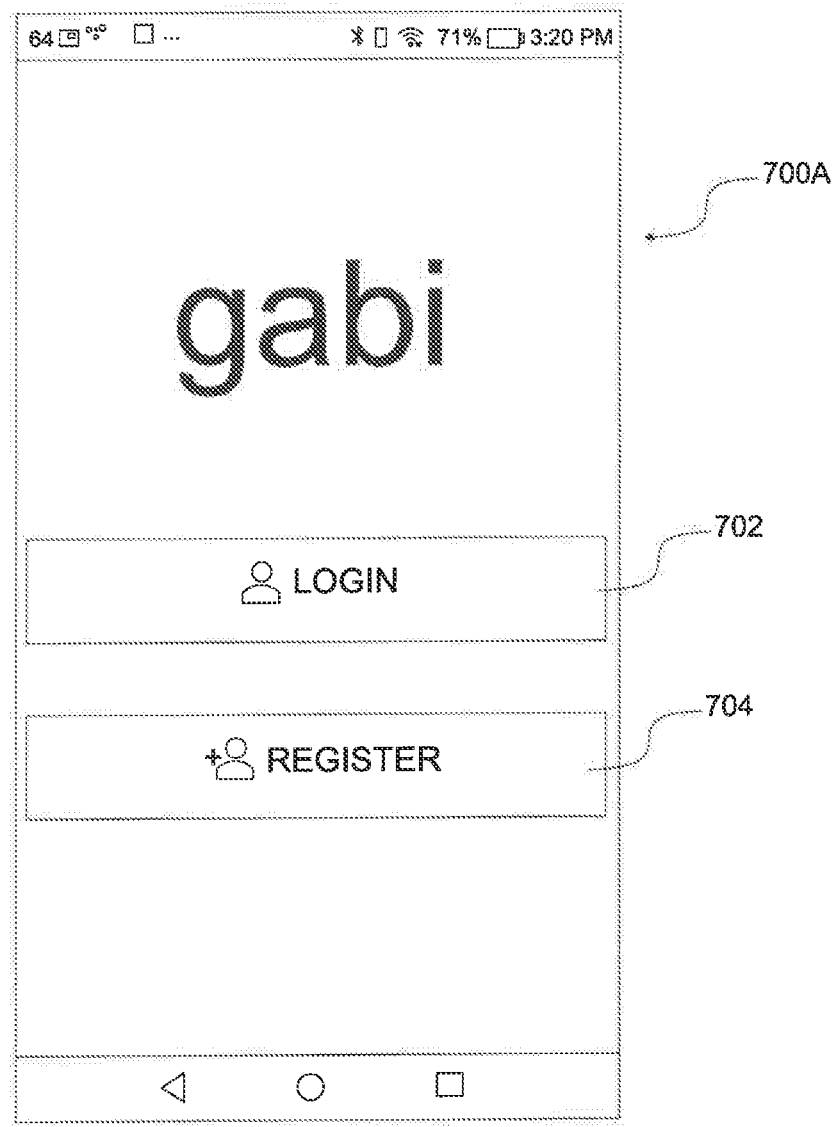
FIGS. 7A-7J depict screen shots of interfaces provided by a user device control on a user device in accordance with embodiments of the present invention.
Figure 7B:
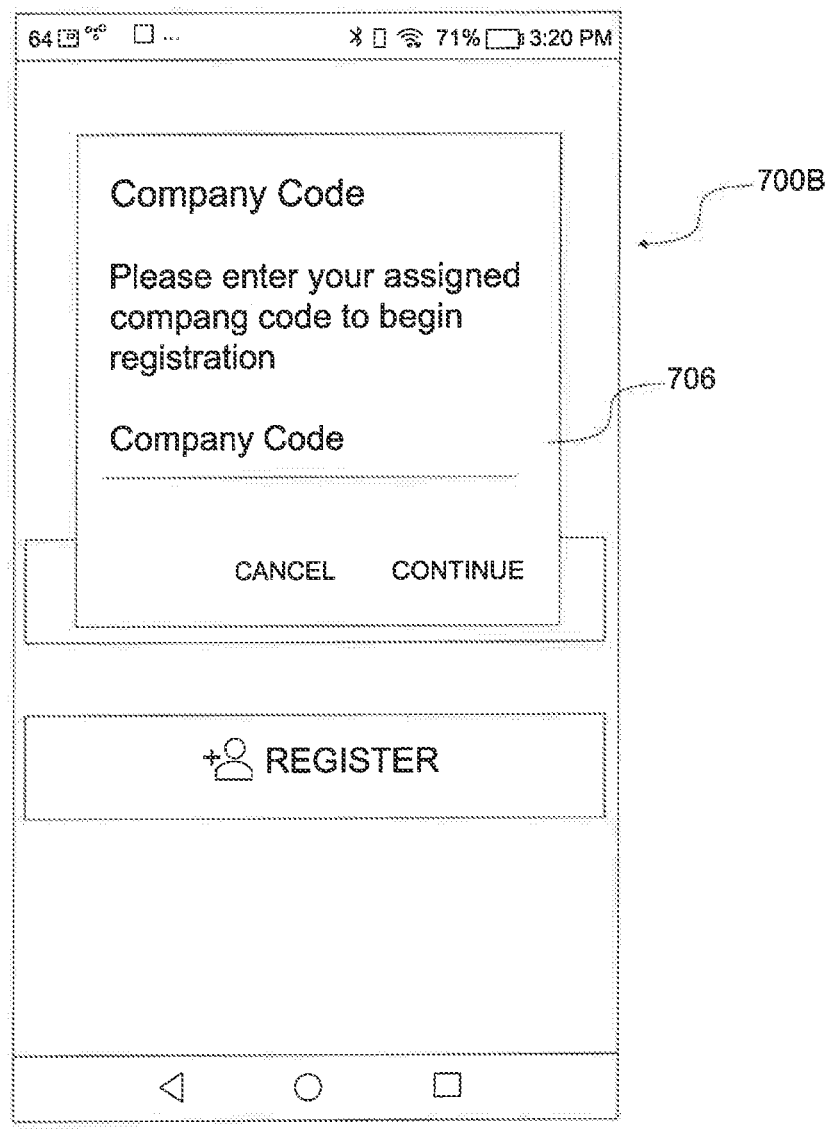
Figure 7C:
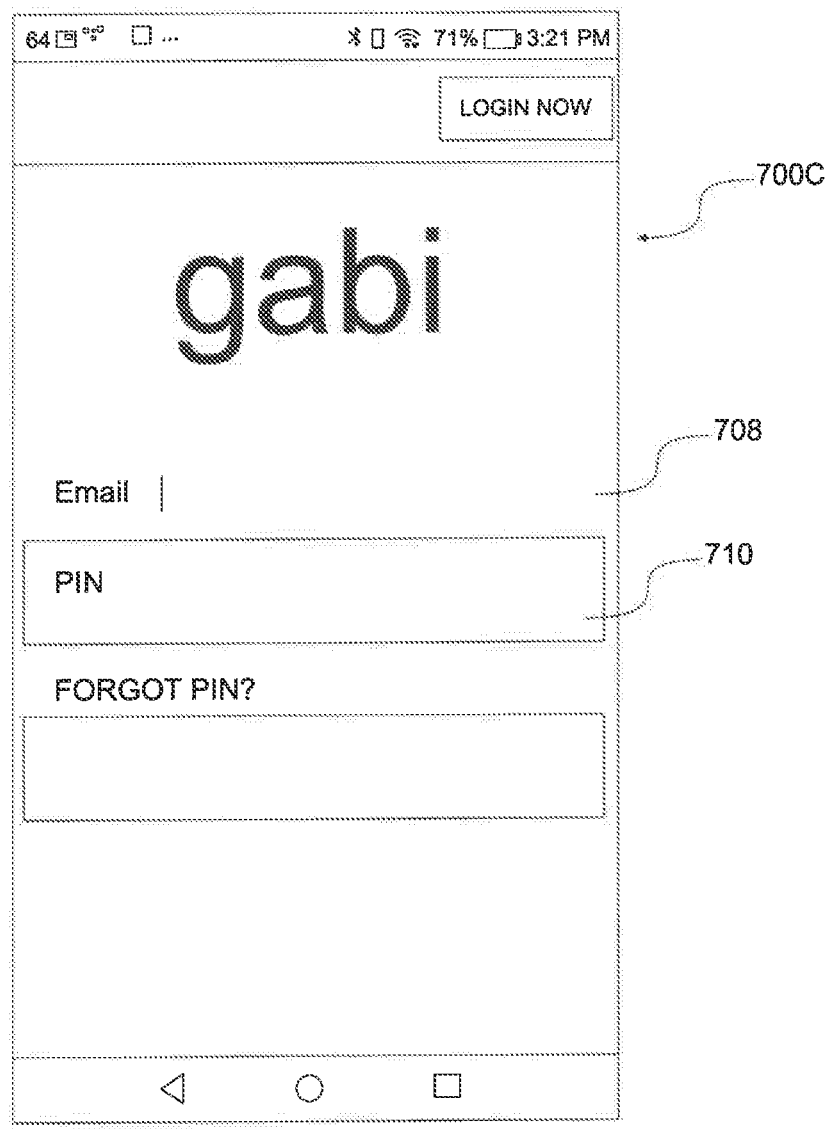
Figure 7D:
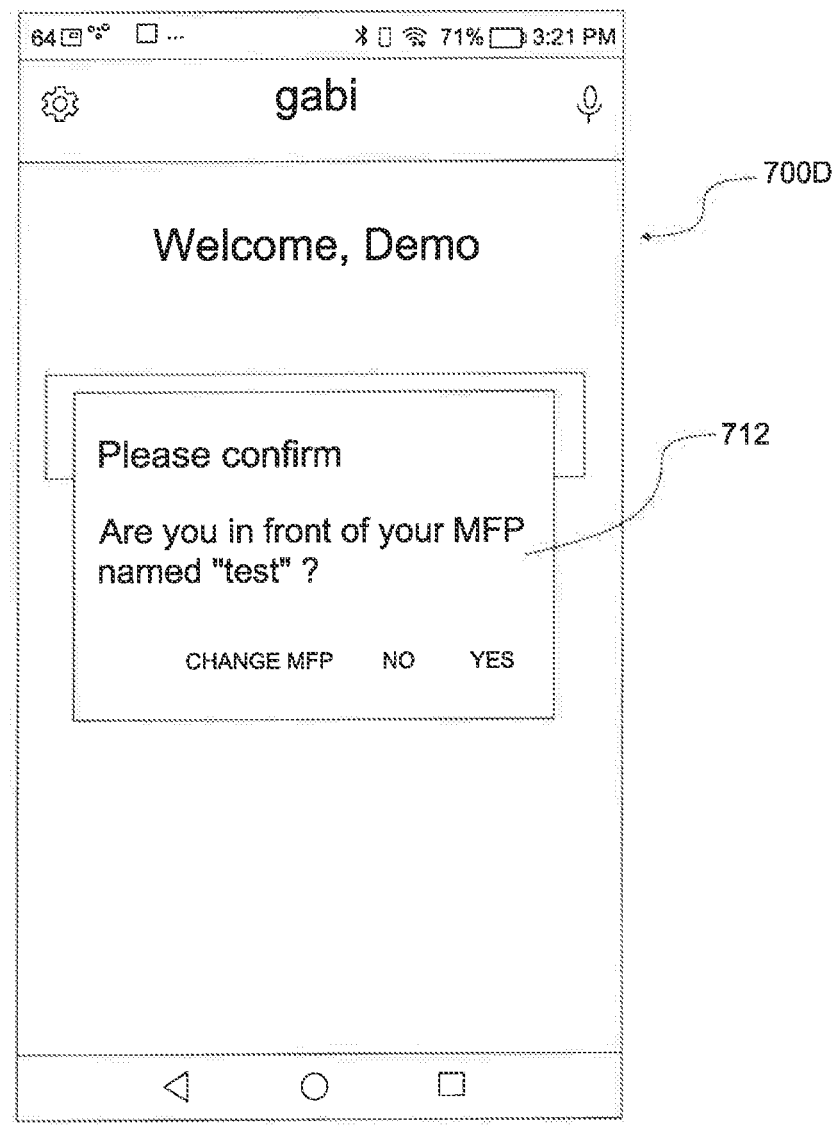
Figure 7E:
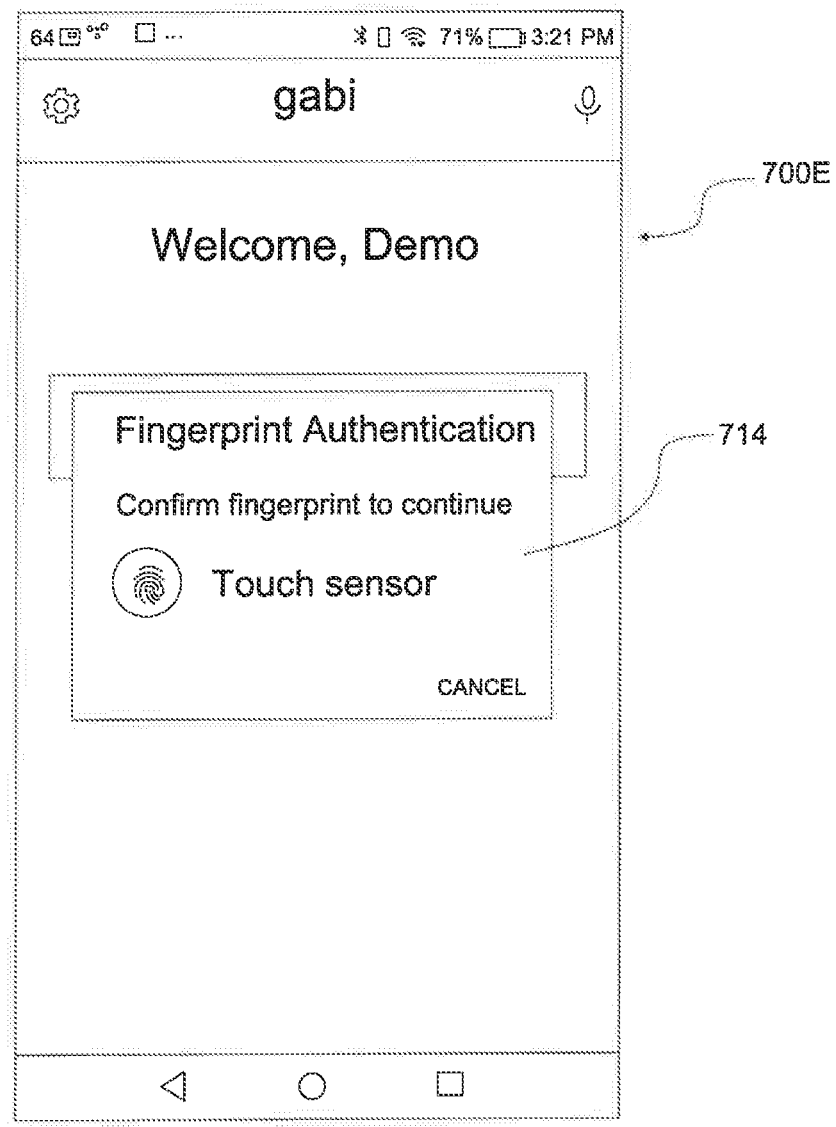

Returning users who select Login 702 on the user interface 700A of FIG. 7A are next presented with the user interface 700C depicted in FIG. 7C, and prompted to enter an email address 708 and PIN 710. Once logged in, a user will be prompted as to whether that user is proximate the target electronic device, i.e., the multi-function printer, as depicted in FIG. 7D, in which the user interface 700D presents a prompt 712 to the user. Two-factor, biometric authentication may be selectively required by, for example, using fingerprint authentication 714, in which case the user interface 700E depicted in FIG. 7E will be provided by the user device control 160. This aspect of the present invention leverages certain functionality native to the user electronic device 20 that may not be native to the target electronic device 30, enabling that device 30 to carry-out or utilize the native functionality. In this case, the user electronic device 20 is capable of carrying out two-factor authentication for example using biometric data as one factor, and embodiments of the present invention enable that function to be used in connection with the target electronic device 30. As depicted in FIG. 7E, user interface 700E prompts the user to initiate a biometric authentication—a finger print in this example—via a touch sensor fingerprint authentication 714. The user's login name and permanent PIN were previously stored on the user electronic device 20 in a secure memory location only accessible with biometric information from the user, e.g., a fingerprint read by the user electronic device 20. The present invention may thereby prevent unauthorized access to the target electronic device 30 or other aspects of the present invention without biometric authentication, when that functionality is not native to the target electronic device 30.

Figure 7F:
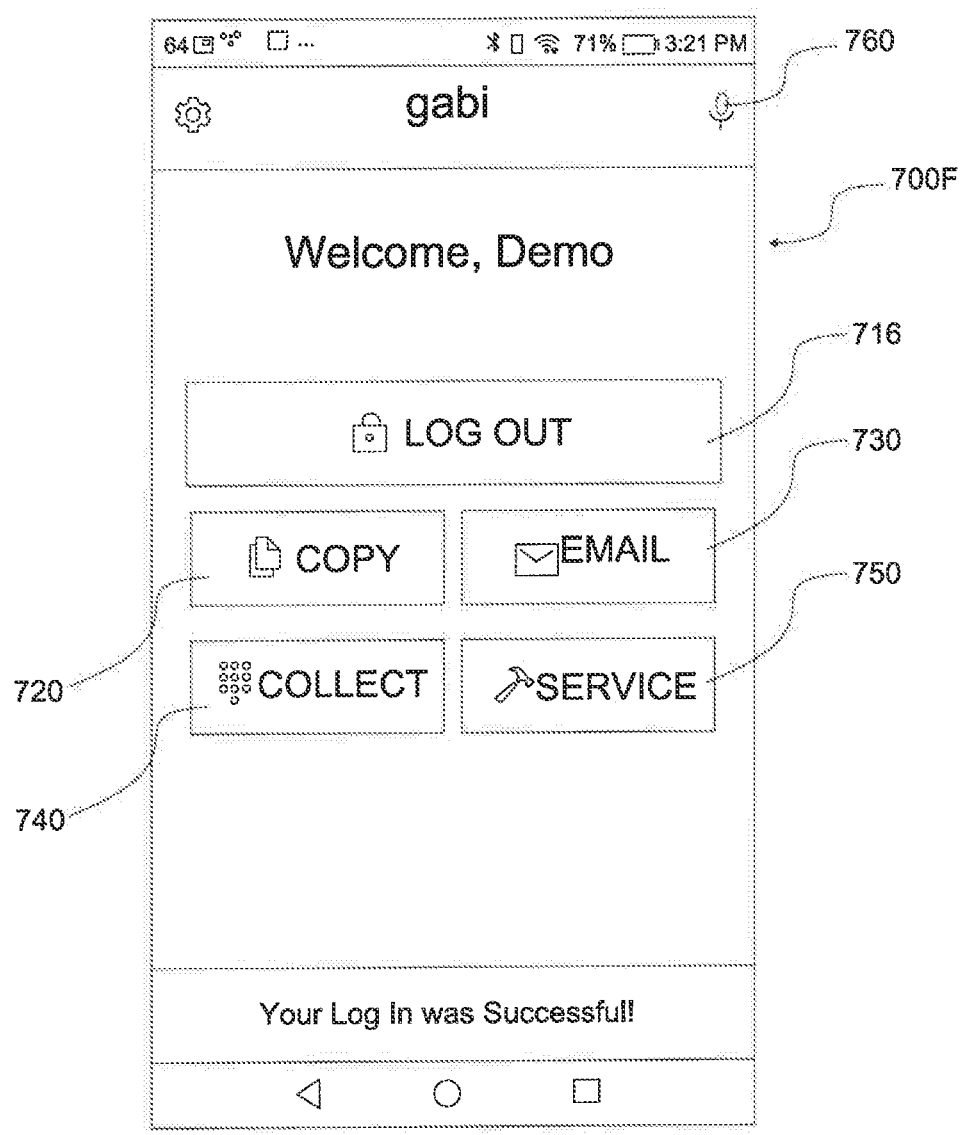

After successful authentication, the user can access and utilize the present invention through user interface 700F depicted in FIG. 7F, which provides the user with a plurality of functions the user may select to access and control a target electronic device 30. In one embodiment, these functions include, by way of non-limiting example, copy 720, email 730, collect 740 and service 750. The user can also use voice activation 760 to carry-out aspects of the present invention, or log out 716. Each of these functions maps to API commands within the user device control 160, and to the smart box 110 which, in turn, accesses and controls a target electronic device 30 to enable that device to perform or respond to the selected function. This aspect of the present invention leverages certain functionality native to the user electronic device 20 that may not be native to the target electronic device 30 to cause that device 30 to carry-out or utilize the native functionality. In this case, the user electronic device 20 is for example capable of responding to audible commands, and embodiments of the present invention enable that function to be used in connection with the target electronic device 30, when that functionality is not native to the target electronic device 30.

Operation and operational aspects of the present invention will now be described, with continued reference to the drawings. The present invention is addable to existing private networks 12 and public networks 10 without changes to either. As an initial step, the smart box 110 is pre-programmed for use in a specific network and network configuration, and to know the credentials of target electronic devices 30 in its network. Parameters for pre-programming the smart box 110 are provided, at least in part, by a person or entity involved with the configuration, setup and operation of aspects of the present invention. For example, pre-programming parameters may include, by way of non-limiting example, IP addresses of each target electronic device 30 in the network to be accessed and controlled by the present invention. This information may be saved, for example, as licensing and configuration data 134c as a data file 134 in data storage 136 of the server 130, and associated with a unique company code that maps a smart box 110 to the licensing and configuration data 134c. The smart box 110 may initially be programmed with an API key that includes a license ID and machine key unique to the smart box 110. When the smart box 110 is initially connected to the private or public network, 12, 10, the smart box 110 communicates the API key to the server 130 as a user name or login ID and password. The server 130 identifies the data file 134 for this smart box 110, and returns licensing and configuration data 134c to the smart box 110. Once a smart box 110 has successfully logged into the server 130 (as just described), the server 130 sends an email, text, or other communication to a destination previously identified when programming parameters were provided about the smart box 110. Typically, for example, this would be an email address of a system administrator. In that email address, a hyper-link is provided that, when selected by the administrator, connects the administrator to the smart box 110 as a console, providing the administrator with access to certain control functions for the smart box 110 and its configuration. For example, once connected as console, the administrator would have access to a pull-down menu on which each target electronic device 30 that is accessible and controllable using the present invention is identified. To enable access and control of each device 30 by the smart box 110 and user device control 160, the administrator may provide super-user credentials for each target electronic device 30. This enables the smart box 110 and user device control 160 to access a target electronic device 30 as a super-user (i.e., as an administrator, service, tech, manufacturer, etc.) and gain access to data captured and stored by/on the target electronic device 30.

Once the smart box 110 is brought online (as described above) and the target electronic devices 30 in its network 12 or 10 are accessible and controllable, the smart box 110 sits in an idle state until a user, using the user device control 160, chooses to execute a command to utilize aspects of the present invention. Notwithstanding the foregoing, the smart box 110 is able to communicate with the server 130 and receive configuration updates from the server 130, as depicted in the flow diagram of FIG. 4.

Voice recognition functionality may be provided by embodiments of the present invention through interaction between the user electronic device 20 and a voice recognition server 150 such as, by way of non-limiting example, IBM Watson. This enables a user to carry out certain aspects of the present invention using audible commands. A user invokes this functionality through the interface of the user device control 160, see, e.g., voice activation 760 in FIG. 7F. The voice recognition server 150 will carry out the steps of converting speech to text, natural language processing (NLP), and text to speech, via special purpose software indicated by reference numeral 152 in FIG. 1. Using an audio input on the user electronic device 20, a user may speak instructions when using the present invention, thus causing a non-voice activated target electronic device 30 to respond to voice commands.

In the case of voice activation 760, the smart box 110 may access a voice recognition service to receive, analyze, and parse the voice commend, and to return a response to the smart box 110 that is then in a format that is transmittable to and understandable by a target electronic device 30, and that which can cause or enable the device 30 to perform the requested function. Referring again to FIG. 1, a voice command spoken by a user into the user's electronic device is transmitted by the user device control 160 to the smart box 110, which identifies the command as a voice command, and transmits it via a secure connection to a voice recognition server 150, such as IBM Watson or Amazon Web Services ("AWS") platform. Communication between smart box 110 and voice recognition server 150 is preferably secured by means of a Transport Layer Security (TLS) 1.2 protocol. Voice recognition may alternatively be implemented in a variety of other ways, including by means of the server 130 and data storage 136 in combination with an associated smart box 110, or by another specialized server and data storage.

Special purpose software in the form of an API 152 as depicted in FIG. 1 may be provided on the voice recognition server 150, and be configured with speech to text, NLP, and text to speech capabilities. The voice recognition server 150 returns text commands to the smart box 110, for transmission thereby to the target electronic device 30.

Figure 7G:
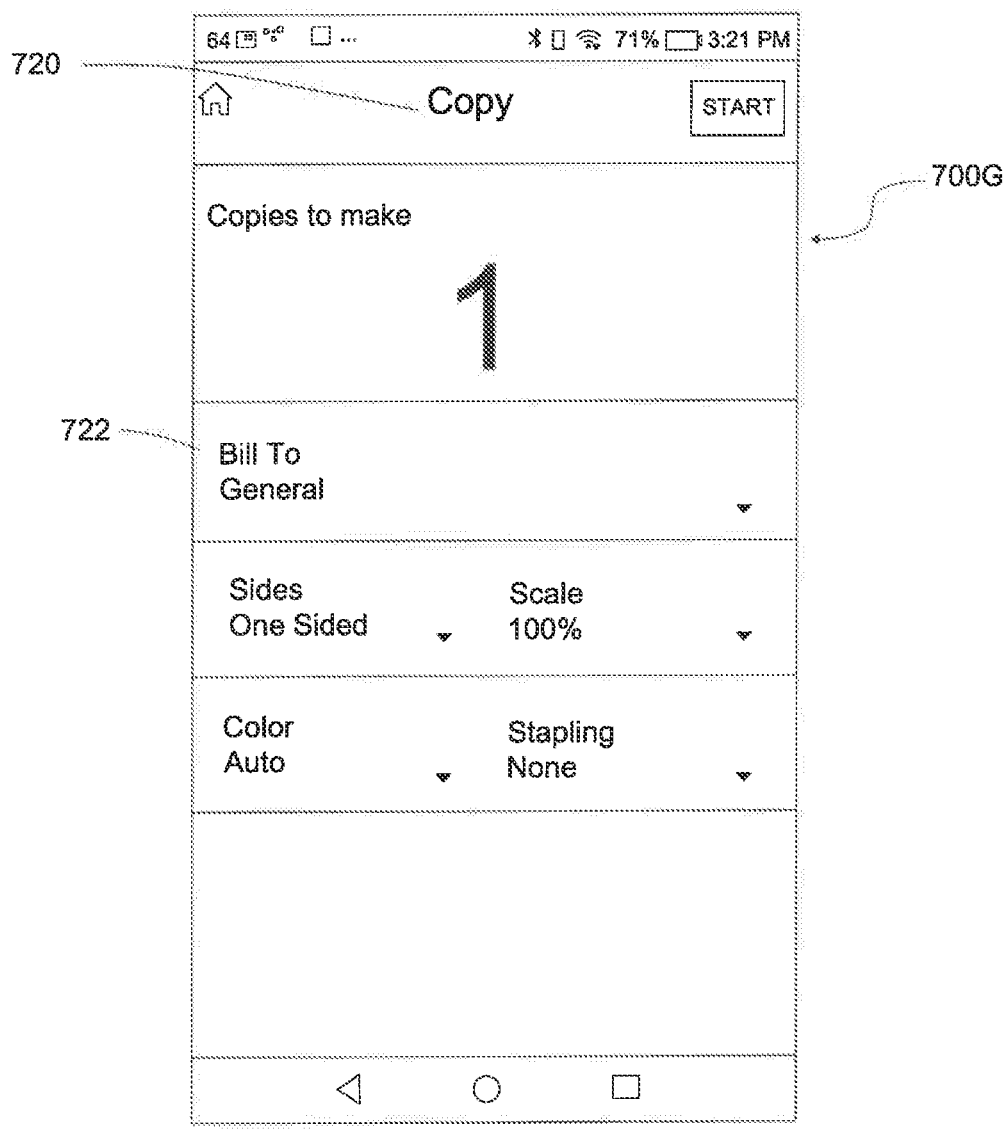

In operation, a user can access the copy function of the present invention via the user interface 700F depicted in FIG. 7F, and by selecting Copy 720, after which the user is presented with the user interface 700G depicted in FIG. 7G. Via this user interface 700G the user can control the target electronic device 30 and cause it to carry out various commands associated with using that device 30 for copying a document.

In operation, a user can access the email function of the present invention via the user interface 700F depicted in FIG. 7F, and by selecting Email 730. The user device control 160 then presents the user interface 700H depicted in FIG. 7H, enabling a user to use the present invention to cause a target electronic device 30, an MFP in this case, to send an email to a recipient selected by the user without access to the email list of the MFP. The present invention thus accesses data and information native to the user electronic device 20 or particular to the user, in this case, the user's email address book 736. This enables the user to cause the target electronic device 30 to send an email to a recipient that is not known to that device 30. Thus, the present invention enables a user to access and control an MFP to cause that MFP to carry out a function different than the functions it is configured to carry out. In addition, the present invention further uses native technology of the user electronic device 20 to leverage already existing connections and permissions (e.g., login details) to facilitate access to documents, services, applications, etc., for various types of user accounts. For example, a user need not enter login credentials for access to files stored in a Dropbox account in order to access these files for use by the present invention, in effect enabling the target electronic device 30 to access these files without requiring the user's login credentials.

As the universal controller, the smart box 110 also has the ability to determine whether a user is violating a predefined rule. For example, for enterprise applications, email rules may be defined regarding permitted and/or restricted email addresses. That information may be stored in a data file 134 on the server 130, in memory on the smart box 110, or both. When a user invokes the email function and attempts to email using the email user interface 700H of FIG. 7H, the smart box 110 and/or server 130 can compare the email recipient against a white-list of permitted recipients, or a black-list of restricted recipients, to determine if the email should be sent.

Figure 7H:
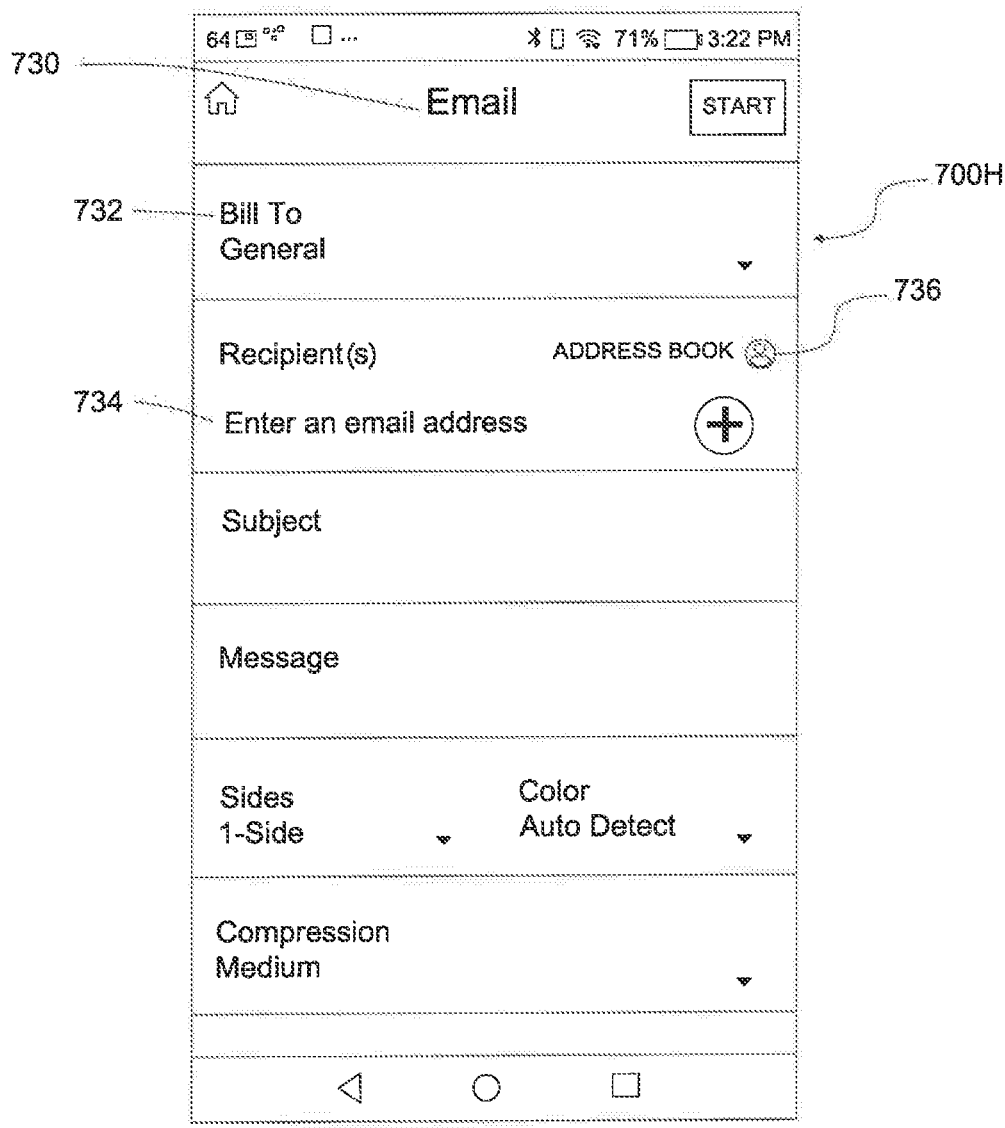
Figure 7I:
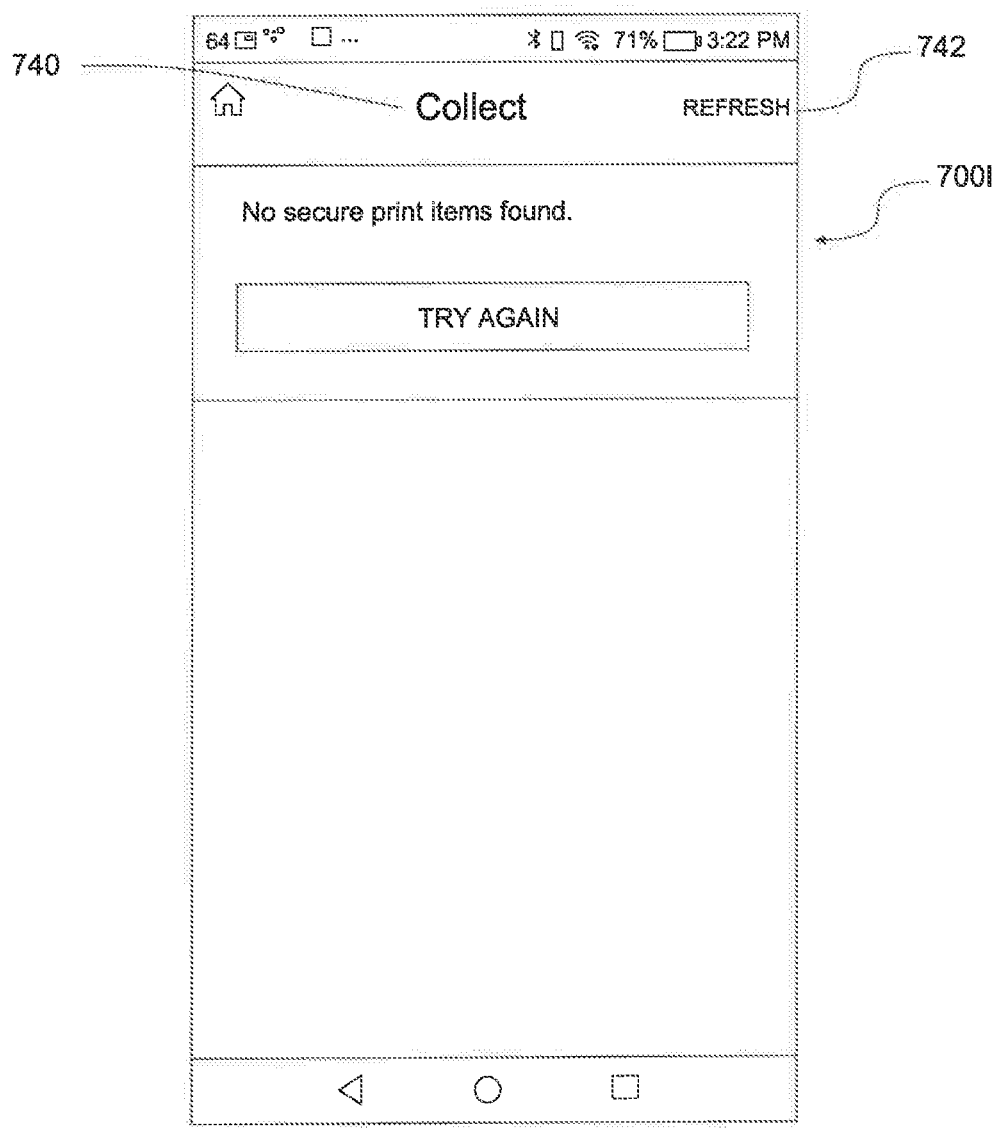

In operation, a user can access the collect function of the present invention via the user interface 700F depicted in FIG. 7F, and by selecting Collect 740, which provides user interface 700I depicted in FIG. 7I. This function enables a user to collect secure documents at the target electronic device 30, in this case the MFP, that can only be printed by the user.

Figure 7J:
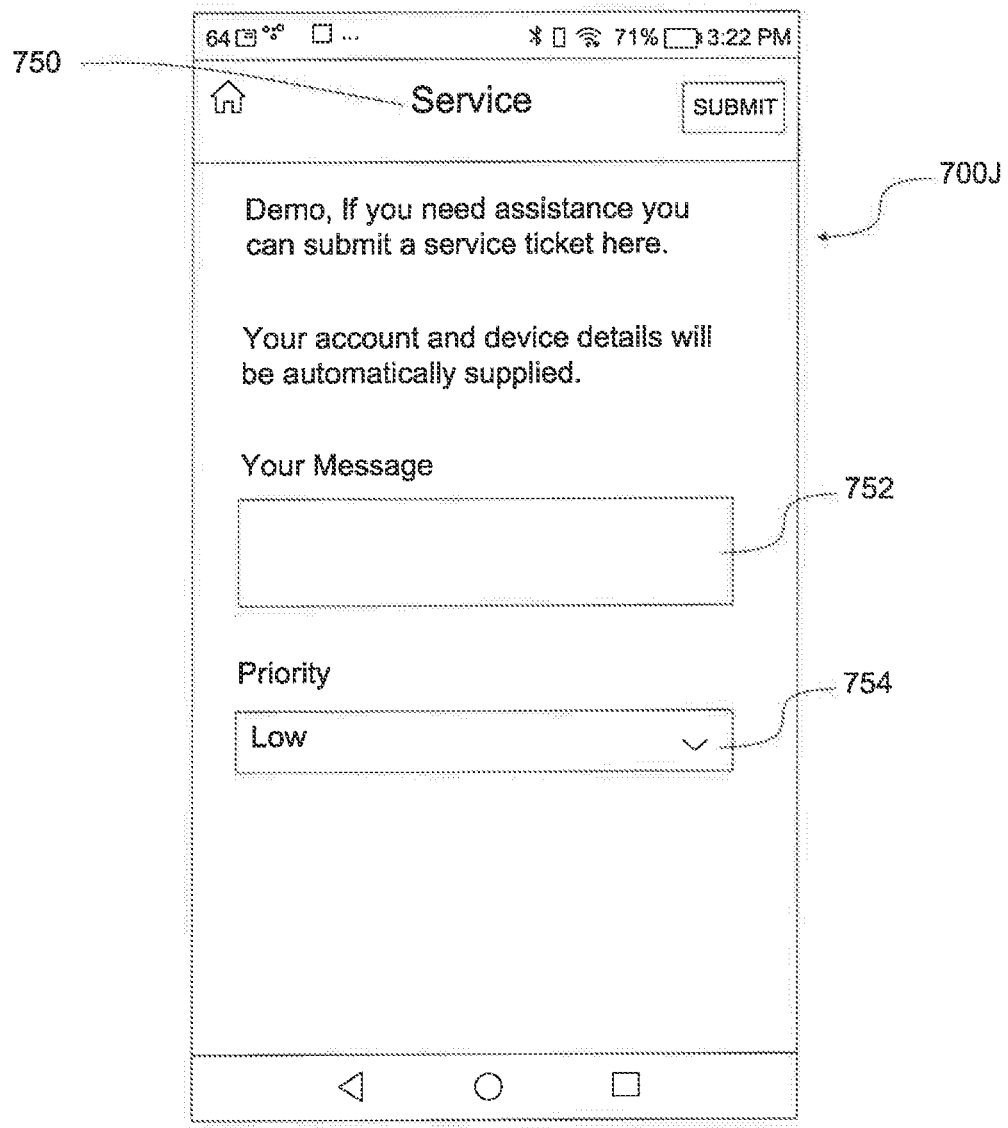

The user interface 700J for user access to the service function 750 is depicted in FIG. 7J. Via this interface 700 the user can submit service calls for the target electronic device 30 by entering a message 752 and indicating a priority level 754. This information is transmitted by the user device control 160 via the API to the smart box 110, which, in turn transmits the service call to the server 130. The server 130 access the service ticket data 134d database to determine the contact rules for service tickets for the subject target electronic device 30, and transmits the service call to the recipient identified in the service ticket data 134d database for the subject device 30.

Any of the afore-discussed functions may also be accessed using voice recognition via the user interface 700F depicted in FIG. 7F, and selecting the microphone 760.

In some cases, the functions available to the user via the user interface 700 provide access to further functions. For example, copy 720 and email 730 functions may provide an option to charge a client or customer for use of the target electronic device 30. It is typical for law firms and accounting forms, for example, to charge clients for copies. In such cases, a code must be entered designating the correct charge-to entity before the target electronic device 30 can be used. The present invention enables a user to access one or more databases of such codes located on the server 130, a remote server or other data storage device that is not connected to and may not be in the same network as the device 30 being accessed and controlled. The user interface 700G for the copy 720 function is depicted in FIG. 7G, and includes a "Bill To" pull-down menu 722 which provides the user with access to a database of client codes selectable by the user to designate a client to charge for use of the target electronic device 30. The client codes accessible to the user via the pull-down menu have been previously mapped to the user's account, thus providing limited and user-specific information.

Similarly, the user interface 700H for the email 730 function is depicted in FIG. 7H, and includes a "Bill To" pull-down menu 732 which provides the user with access to a database of client codes selectable by the user to designate a client to charge for use of the target electronic device 30. This user interface 700H also includes a "Recipient" field 734 that can be populated with one or more email addresses selected from the user's contacts. While an MFP can be configured and used to send email, it is limited to the contacts programmed into the MFP. With the present invention, the email function of an MFP is accessed and controlled in a way that enables the user to send emails from the MFP to recipients in the user's contact list, or from a contact list that is not known by the MFP or other target electronic device 30.

Another embodiment of the present invention provides the ability to intelligently manage one or more target electronic devices 30. As noted, the smart box 110 has super-user access to data collected and stored by a device 30. Such data provides a variety of useful information about usage of the device 30 such as, for example, which paper trays are used most often, time-based use of the device 30, and other use and operational characteristics and data of the device 30. In accordance with embodiments of the present invention, the smart box 110, having access to this data, may use this data to intelligently control use of the target electronic device 30. For example, if an MFP has a plurality of paper trays configured for the same size paper, with one tray being a default tray, that tray is likely to be used more often than the others. As a result, parts of that tray are exposed to more use than parts of the other trays. Knowing this, the present invention can direct print, copy, etc., commands to effect a more uniform use of the target electronic device 30. This will result in greater longevity for the parts of the target electronic device 30, and a reduction in service calls and repairs.

The present invention can also be used to automate certain service conditions for a target electronic device 30. For a type of device, like an MFP, there may be a finite set of problems that occur with the greatest frequency. Once this set of problems is identified, the smart box 110 can be configured to automatically detect the occurrence of such a problem at a target electronic device 30 and automatically create a service call without the need for user involvement.

A licensing and data configuration file 134c may contain information specific to this user, including rules that define authorized and unauthorized features this user is permitted to access, and other rules defining permissible use by this use of the target electronic device 30. It is thus possible for the smart box 110 to initially flag a command from a user, and to communicate with the server 130 to determine whether the command violates a rule for that user. Server 130 may, for example, be configured as an artificial intelligence-based analysis engine capable of analyzing a risk level associated with the command based on data gathered by a smart box 110 for similar commands made on the target electronic device 30 as well as other similar devices 30 (e.g., target electronic devices 30 in the same private network 12). The server 130 can thus determine whether the command is an exception, and if so, whether the exception has been or can be resolved. As noted, the smart box 110 functions as a universal controller, controlling user access to and use of target electronic devices 30. When a command is received by the smart box 110, it can determine if the command is an exception that is out of compliance with rules for the user. This can be by the smart box 110 alone, or together with the server 130. From the information in the data storage 136 specific to this user, and based upon the instruction transmitted by the user device control 160, the server 130 may transmit information back to the smart box 110 providing a disposition instruction with respect to the instruction, e.g., indicating that the command has been executed or not.

In assessing a command and determining whether it's an exception or there is a risk, server 130 will consider past experience with the requesting user, the target electronic device 30, and other similar devices 30, as well as other pertinent information that may be available to the server 130 (for example, suspect production request patterns reported by other document production centers), the server 130 may prepare a request disposition and transfer this information to the smart box 110 to guide the response of the smart box 110 to the document production request. For example, the response disposition may authorize the smart box 110 to instruct the target electronic device 30 to proceed to fulfill the document request in its entirety ("green light").

Alternatively, if the server 130 concludes that there is some risk associated with the document request or finds that the request will exceed document production features and permissions either for the user or the type of transaction (for example, excessively-high page counts), the request disposition may instruct the smart box 110 to provide altered instructions to the document processing device ("yellow light"). For example, the request disposition may instruct the smart box 110 to diminish the requested number of copies or rate of printing of copies as would be expected in response to the production request. Alternatively, the smart box 110 may be instructed to forward the document request to another smart box 110 associated with a target electronic device 30 that, for example, has been reserved and isolated for production requests identified as presenting some risk.

Finally, if the server 130 concludes that the production request presents a significant risk or is well outside the limits of associated production features and permissions, the request disposition may call for the rejection of the production request ("red light"). If the product request is at least partially executed, the smart box 110 may preferably collect execution information from the target electronic device 30 providing details about the execution and/or information about the current state and resources available to the device 30.

Although specific example embodiments have been described, it will be evident that various modifications and changes may be made to these embodiments without departing from the broader scope of the inventive subject matter described herein. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This description, therefore, is not to be taken in a limiting sense, and the scope of various embodiments is defined only by the appended claims, along with the full range of equivalents to which such claims are entitled.

What is claimed is:

1. A system for enabling a target electronic device to be controlled by a user electronic device having at least one function, the system comprising:
   a smart box connectable to at least one network and to the target electronic device, the smart box having a central processing unit comprising a processor and memory having stored therein general purpose software, and having storable therein smart box special purpose software; and
   a server connectable to the at least one network and to the smart box, the server having a processor and memory configured for storing therein server special purpose software,
   wherein the smart box is connectable to the user electronic device via the at least one network and is configured to permit a user of the user electronic device to access at least one preset function of the target electronic device, whereby the target electronic device is enabled to at least one of perform or respond to the at least one function of the user electronic device, and
   wherein the at least one function of the user electronic device is native to the user electronic device.

2. The system according to claim 1, wherein the at least one function of the user electronic device comprises two-factor authentication.

3. The system according to claim 2, wherein the two-factor authentication comprises fingerprint authentication.

4. The system according to claim 1, wherein the at least one function of the user electronic device comprises voice activation.

5. The system according to claim 4, wherein the at least one network is further configured for connection to a voice recognition server.

6. The system according to claim 1, wherein the at least one network comprises at least one private network.

7. The system according to claim 1, wherein the at least one network comprises at least one public network.

8. The system according to claim 1, wherein the memory of the server is further configured for storing data for configuring the smart box.

9. The system according to claim 1, wherein the memory of the server is further configured for storing usage data for the target electronic device.

10. The system according to claim 9, wherein the smart box is further connectable to the server and further configured for at least one of generating or collecting the usage data for the target electronic device.

11. The system according to claim 1, wherein the target electronic device comprises a multi-function printer (MFP).

12. A method for enabling a target electronic device to be controlled by a user electronic device having at least one function, the method comprising the steps of:
    connecting a smart box to at least one network and to the target electronic device, the smart box having a central processing unit comprising a processor and memory having stored therein general purpose software, and having storable therein smart box special purpose software;
    connecting a server to the at least one network and to the smart box, the server having a processor and memory configured for storing therein server special purpose software;
    connecting the smart box to the user electronic device via the at least one network;
    operating the smart box to permit a user of the user electronic device to access at least one preset function of the target electronic device, whereby the target electronic device is enabled to at least one of perform or respond to the at least one function of the user electronic device,
    wherein the at least one function of the user electronic device is native to the user electronic device.

13. The method according to claim 12, wherein the at least one function of the user electronic device comprises two-factor authentication.

14. The method according to claim 12, wherein the at least one network comprises at least one private network.

15. The method according to claim 12, further comprising the step of configuring the memory of the server for storing data for configuring the smart box.

16. The method according to claim 12, further comprising the step of configuring the memory of the server for storing usage data for the target electronic device.

17. The method according to claim 16, further comprising the steps of:
    connecting the smart box to the server; and
    configuring the smart box for at least one of generating or collecting the usage data for the target electronic device.

18. At least one non-transitory computer-readable storage medium, comprising a set of instructions for execution by a smart box for enabling a target electronic device to be controlled by a user electronic device having at least one function, which in response to being executed by the smart box, cause the smart box to:
    connect to a server and to the user electronic device via at least one network;
    connect to the target electronic device; and
    permit a user of the user electronic device to access at least one preset function of the target electronic device, whereby the target electronic device is enabled to at least one of perform or respond to the at least one function of the user electronic device,
    wherein the at least one function of the user electronic device is native to the user electronic device.

19. The least one non-transitory computer-readable storage medium according to claim 18, wherein the at least one function of the user electronic device comprises two-factor authentication.

20. The least one non-transitory computer-readable storage medium according to claim 18, wherein the at least one network comprises at least one private network.

* * * * *